Figure 1:
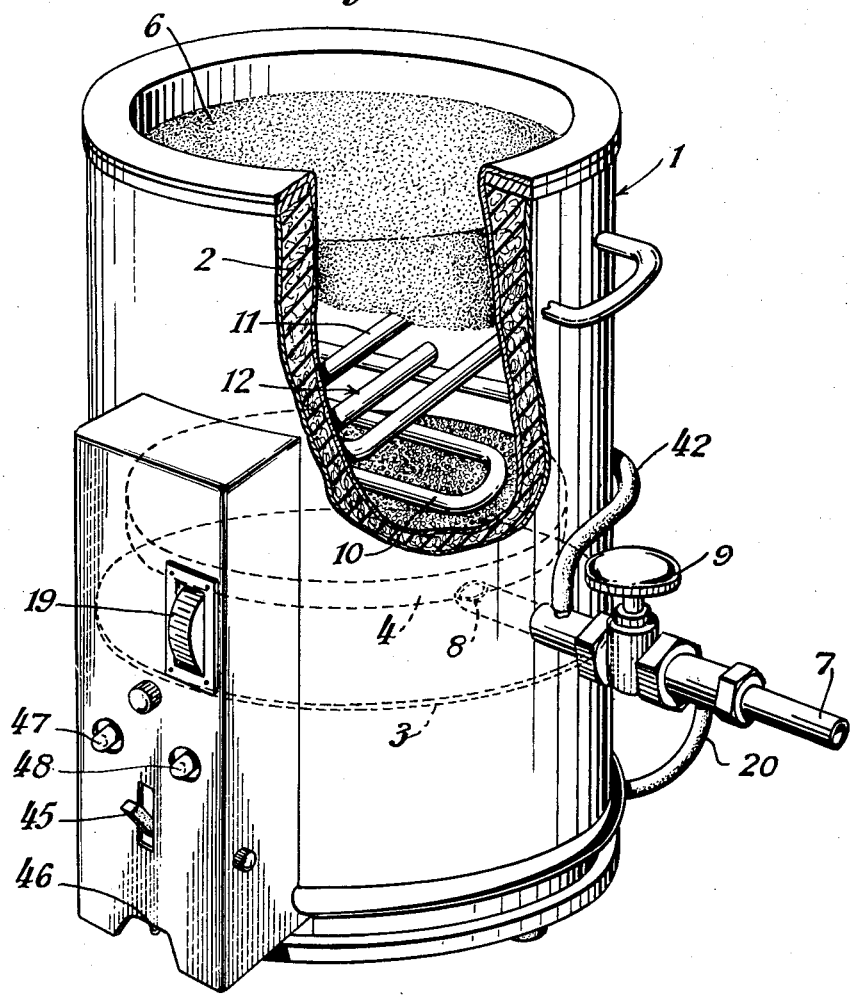

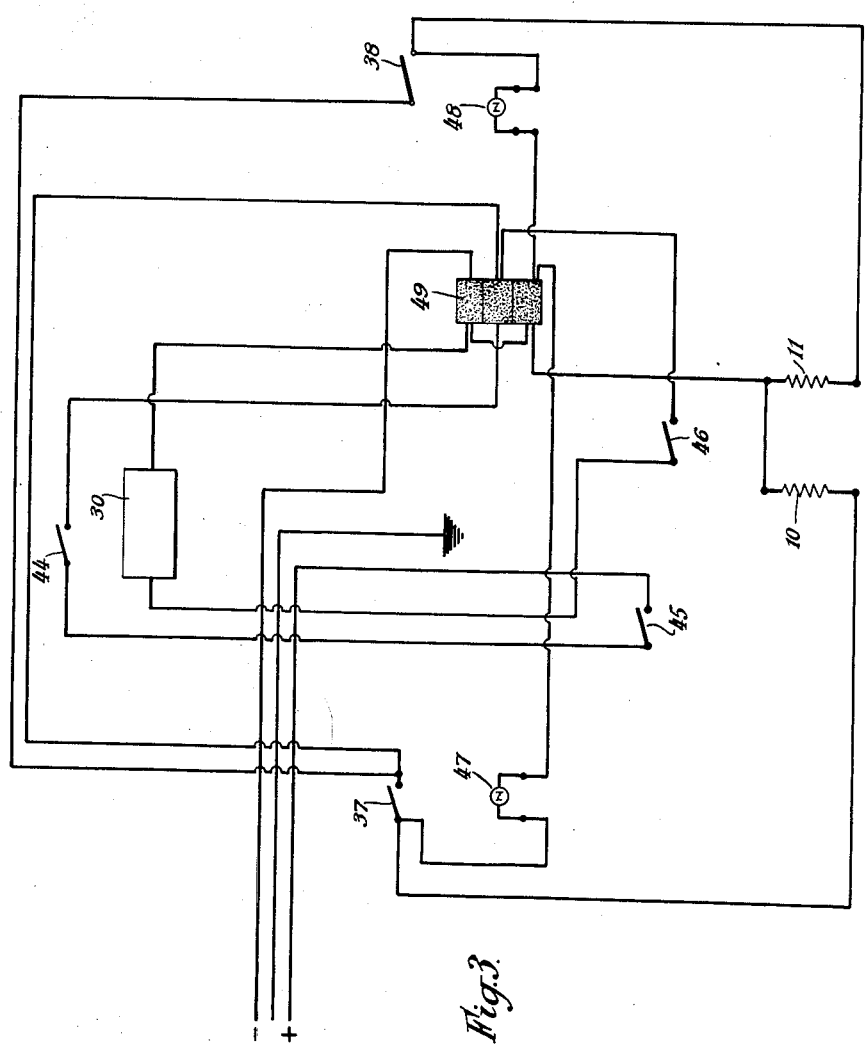

United States Patent Office 3,196,251
Patented July 20, 1965

3,196,251
THERMOSTATICALLY CONTROLLED FLUIDIZED
SOLID PARTICLE BATH APPARATUS
Norman Adrian De Bruyne, Duxford, Cambridge, England, assignor to Techne (Cambridge) Limited, Duxford, Cambridge, England
Filed May 23, 1963, Ser. No. 282,613
Claims priority, application Great Britain, July 5, 1962, 25,867/62; July 24, 1962, 28,445/62; Sept. 3, 1962, 33,752/62
8 Claims. (Cl. 219—378)

This invention relates to thermostatic controllers for maintaining the temperature of the contents of a bath or other container constant or substantially constant, the invention being particularly applicable to laboratory use. The thermostatic controller in accordance with the present invention has certain features in common with my earlier U.S. Patent No. 2,795,686 and co-pending patent application No. 268,109, now U.S. Patent No. 3,147,365, but has been designed specially for use with baths or other containers wherein the contents have necessarily to be kept at a comparatively high temperature in the region of 300° C. which would virtually exclude the use of liquids.

It is proposed therefore to use "fluidised sand" as the contents of the bath or other container and to employ as a thermostat a centre rod of low thermal expansion and composed for example of glass or an iron-nickel alloy contained within a tube composed of a material having a higher degree of thermal expansion, such as for example, a brass or mild steel tube, the inner and outer components being joined together at their unsupported ends, the opposite end of the tube being mounted on the inner surface of the wall of the bath, the centre rod passing through the wall of the bath and operating mechanism hereinafter described.

The term "fluidised sand" is used to define a granular material which when air or a gas is passed therethrough becomes virtually suspended in the air or gas and consequently the volume of the contents of the bath or other container is substantially increased, the sand or other granular substance being then said to be in a fluid state.

A thermostatic controller in accordance with the present invention includes a thermostat and electric heater immersed in the contents of the bath or other container, the contents of which it is desired to maintain at a predetermined temperature, the thermostat being for example of the type hereinbefore described, a jet supplied with air or gas at a pulsating pressure, a flapper mounted in front of said jet and connected with the thermostat so that movement of the thermostat as a result of variations in temperature of the bath's contents will vary the width of gap between the flapper and jet, and means responsive to variations in pulsating pressure in the circuit consequent upon restriction in the outflow of air or gas from the jet due to a reduction in the gap between the jet and flapper actuating switching means controlling the energisation of the electric heater.

The pressure responsive means preferably comprises a capsule actuating a micro-switch and interposed between a pulsator and the jet, the pulsator being supplied with air from a suitable pump via a restrictor or capillary tube.

As the capsule would not operate to switch-off the electric heater in the event of the air supply failing, it is proposed to provide a second capsule and micro-switch in the pipe line leading to the pump which will maintain the micro-switch closed when there is pressure in the pipe line, the capsule opening the switch to break the heater circuit should the air supply fail.

According to a further feature of the invention a plurality of heaters are employed which are brought into and out of operation sequentially controlled by micro-switches which are closed and opened sequentially by one or more capsules responsive to variations in air pressure in the circuit containing the jet.

According to a still further feature of the invention means is provided whereby the electrical heater circuit will be automatically broken in the event of the pressure supply maintaining the sand in a fluidised state failing such means preferably including a weighted diaphragm which is subjected to pressure of the air supply, which in turn opens a switch controlling the heater circuit should the air pressure supply fail or fall below a pre-determined safe minimum.

Figure 2:
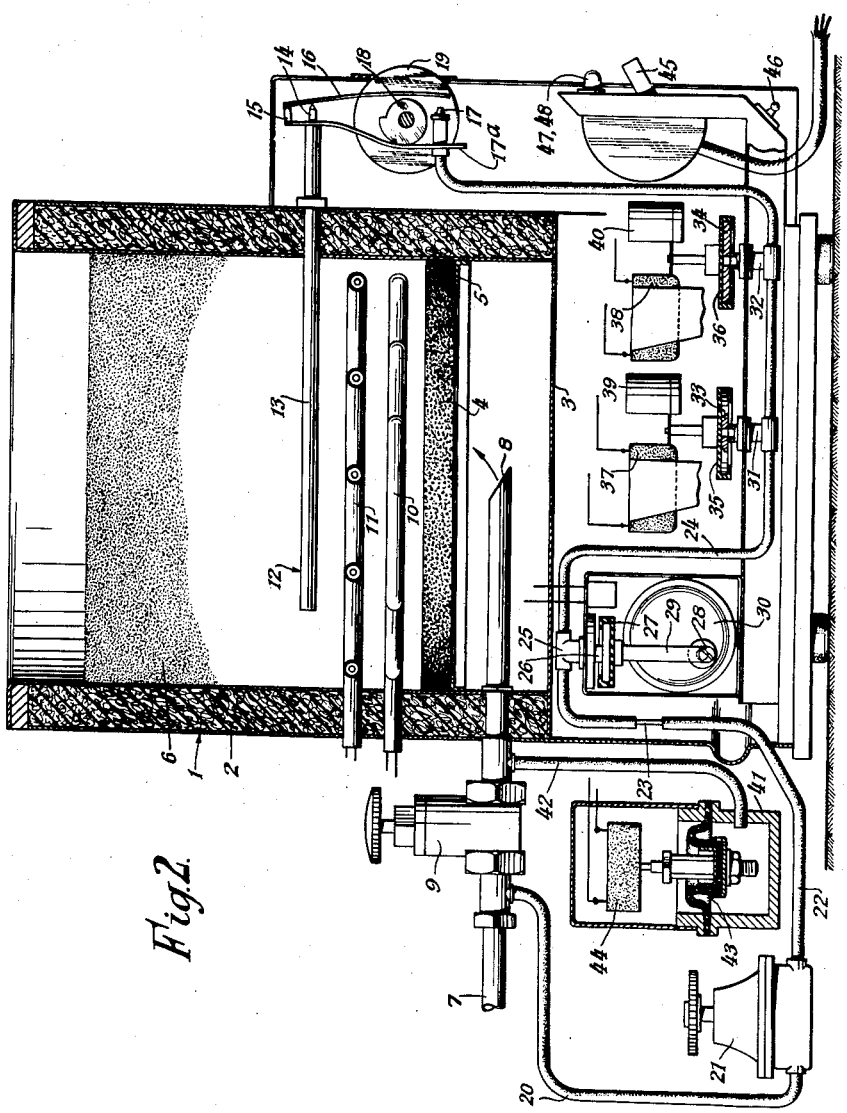

Referring to the accompanying drawings:
FIGURE 1 is a perspective view partly in section of a fluidised sand bath incorporating the invention;
FIGURE 2 is a sectional elevation partly diagrammatic to show the various component parts; and
FIGURE 3 is an electrical wiring diagram.

Referring in the first case to FIGURES 1 and 2, the fluidised sand bath comprises a metal double walled cylindrical shell 1, the walls containing a ceramic or other heat insulating lining 2, the shell being closed at its lower end at 3 and containing a porous plate 4 supported at its periphery on an annular support 5.

The bath contains sand or other suitable granular material 6 which is maintained in a fluidised state by air or gas which passes upwardly through the sand after passing through the porous plate 4, the air or gas being supplied under pressure through a supply pipe 7, the outlet end 8 of which is situated beneath the porous plate 4.

The supply of air or gas is under the control of a control valve 9.

The bath contains two electric heating elements 10 and 11 and a thermostat 12, the latter comprising a tubular outer element 13 containing a concentrically arranged inner rod 14, the rod and tube being connected together at their unsupported ends, the centre rod 14 being composed for example of quartz, glass or an iron-nickel alloy, the material comprising the tube having a higher degree of thermal expansion such as for example brass or mild steel.

The tube 13 carries a bracket 15 at its outer end which in turn supports a depending flapper 16 which is engaged by the pointed extremity of the rod 14, the latter maintaining the flapper at a determined distance from a jet 17 hereinafter described. It will be appreciated therefore that as the temperature in the bath increases the rod will retract to allow the flapper to approach more closely to the jet to increase the pressure in the tube supplying air to the jet and to break the electrical circuits to the heaters in the manner hereinafter described. To determine the temperature at which the heaters will be switched off a snail cam 18 is provided associated with a rotatable calibrated drum dial 19 which when rotated, rotates the cam, the latter bearing on a pivoted lever 17a carrying the jet 17 and thus varying the distance separating the jet from the flapper.

Air under pressure from pipe 7 enters branch pipe 20 and after passing a standard type of constant pressure control valve 21 enters pipe 22 leading to a constriction 23, the air thence passing to the jet via pipe 24.

Pipe 24 is connected via a branch connection 25 with a capsule 26 containing a rubber diaphragm 27 which is deflected by means of an eccentric or crank-pin 28 and connecting rod 29, the eccentric being driven by an electric motor 30, thus setting up a pulsating pressure in the pipe 24 and jet 17.

Additional branch connections 31 and 32 lead to capsules 33 and 34 each including a flexible diaphragm 35 and 36 which actuate micro-switches 37 and 38 controlling the supply of electric current to heaters 10 and 11.

As it is desired that capsules 33 and 34 shall break the electrical circuits in heaters 10 and 11 successively, diaphragms 35 and 36 are unequally loaded by weights 39 and 40 of different mass.

In order that the heaters shall not continue to operate if the air supply maintaining the sand in a fluidised state should fail or the pressure should fall below a predetermined value a further capsule 41 is provided connected with the pipe leading to outlet 8 by branch pipe 42.

Capsule 41 contains a rubber or other flexible diaphragm 43 which is loaded by a weight and on the pressure in the capsule falling below a pre-determined value operates a micro-switch 44.

The apparatus includes a mains on-off switch 45, a switch 46 controlling motor 30 and indicator lights 47 and 48 giving a visual indication as to whether each heater is in operation.

FIGURE 3 shows the complete wiring system of the apparatus, a terminal block for the various electrical connections being indicated by reference numeral 49.

On switching on the bath at room temperature the flapper 16 will be a long way from the jet 17 and consequently the micro-switches 37 and 38 will be closed. If therefore switches 45 and 46 are closed and the air supply switched on both heaters will be in operation. In this way the contents of the bath will receive the maximum heating effect for quick warming up to the desired temperature, the calibrated drum 19 having been set to indicate that temperature.

As the temperature increases, rod 14 will be retracted and allow the flapper to approach closer to the jet thus increasing the pressure in the system. The distance separating the flapper from the jet will have been set initially by appropriate setting of the drum dial and rotation of th snail cam and consequently the temperature in the bath will increase until the flapper reaches a position relatively to the jet previously set by the dial to produce an increase in pressure sufficient to operate the more sensitive capsule and open the micro-switch controlling the first heater. The temperature of the bath will thereafter continue to rise but more slowly and the second capsule will operate to break the electrical circuit of the second heater, the second micro-switch being thereafter switched on or off automatically to maintain the bath at the predetermined desired temperature.

If the desired temperature is so high that the second heater gives insufficient heat to maintain the temperature, the first capsule will then by controlling the first heater maintain the temperature constant, the second heater remaining on constantly.

Any number of heaters and their associated controlling capsules and switches may be employed.

It will be appreciated that by providing the pulsator which has the effect of superimposing an oscillating air pressure on the substantially uniform controlling air pressure, the temperature swing will be considerably reduced whereby the temperature of the bath can be maintained within closer limits.

I claim:
1. In a temperature regulating device especially suited for the regulation of the temperature within a container having at least one electric heating means therein,
   a thermostat of the type adapted to operate by linear movement of the end of a first part thereof, with respect to a fixed portion of a second part in response to changes in temperature.
   jet means including a jet orifice,
   means to hold said jet means in a predetermined position,
   a source of gas pressure including a gas pressure line connected to said jet means so that a stream of gas is projected from said jet orifice,
   means connected to said gas pressure line for superposing a pulsating gas pressure on said gas pressure supplied to said gas pressure line of the jet means,
   a flapper having one end thereof fixed with respect to the fixed portion of said thermostat, said flapper having its opposite end positioned in front of said jet orifice, an intermediate portion of said flapper being flexible, said intermediate portion of said flapper being positioned in the path of movement of the end of the first part of said thermostat whereby the position of said opposite end of said flapper with respect to said jet orifice is determined by the movement of the end of the first part of said thermostat in response to temperature changes.
   constriction means in said gas pressure line whereby pressure is built up in said gas pressure line between the constriction means and the jet as the flapper end moves closer to said jet orifice,
   pressure sensitive control means connected to said gas pressure line between the jet and the constriction means and responsive to the change in pressure within said gas pressure line to control the supply of electricity to the electric heater means.

2. The device as claimed in claim 1 wherein the means to hold said jet means comprises manually operable means for changing the distance between the jet orifice and the opposite end of the flapper to change the control temperature of said device.

3. The device as claimed in claim 1 wherein the means to hold said jet means comprises a flexible arm fixed at one end and carrying the jet means at the opposite end, snail cam means positioned to contact an intermediate portion of said arm to change the distance between the jet orifice and the opposite end of said flapper.

4. The device as claimed in claim 1, in which the pressure sensitive means responsive to the change of pressure in the gas pressure line to control the supply of electricity to the electric heater means comprises a pressure responsive capsule and a microswitch actuated by said capsule.

5. The device as claimed in claim 1 wherein the electric heating means for the container comprises first and second electric heaters and wherein said pressure sensitive control means comprises first and second pressure sensitive controls, each connected to said gas pressure line to control the supply of electricity to said first and second electric heaters respectively,
   said first and second controls being constructed and arranged to respond at different pressures to changes of pressure in the gas pressure line.

6. The device as claimed in claim 1 wherein the means for superposing a pulsating gas pressure on said gas pressure supplied to said jet means comprises diaphragm pump means having one side thereof connecting with said gas pressure line and rotating means for pulsating said diaphragm pump means.

7. In combination, a fluidized solid particle bath and means for controlling the temperature of said bath,
   said solid particle bath being closed at the bottom and having a porous plate spaced from the bottom adapted to prevent movement of the solid particles therethrough,
   pipe means extending into the region between the bottom and said porous plate for supplying gas pressure thereto,
   at least one electrical heating means in said bath above the porous plate,
   said means for controlling the temperature of said bath comprising a thermostat of the type adapted to operate by linear expansion and movement of one part thereof with respect to another part having a portion thereof extending into said solid particle bath to sense the temperature of said bath,
   a jet means including a jet orifice,
   a gas pressure line having one end thereof connected to said jet means,
   the other end of said gas pressure line being connected to said pipe means supplying gas pressure to said bath,
   constriction means in said gas pressure line between the jet means and the pipe means,
   means operatively associated with said jet orifice and controlled by the movement of said one part of said thermostat for regulating the escape of gas from the jet orifice whereby to vary the pressure build-up in said gas pressure line between said constriction means and said jet means in accordance with the temperature sensed by said thermostat, an electrical circuit comprising a microswitch connected to said electrical heating means for controlling the supply of electrical current thereto, pressure sensitive means operatively connecting said microswitch to said pressure line, said microswitch, pressure sensitive means, jet means and thermostat being constructed and arranged so that said microswitch normally connects the heater to the source of current except when a predetermined pressure is built-up in said pressure line, a second microswitch adapted to connect and disconnect the supply of electric current to the electrical circuit for said electrical heating means, pressure sensitive diaphragm means adapted to connect and disconnect said second microswitch, means operatively connecting said diaphragm means to said pipe means, said second microswitch diaphragm means and means operatively connecting the diaphragm means to the pipe means being constructed and arranged to turn said second microswitch off when said pipe means fails to supply air pressure thereto.

8. In the combination device as claimed in claim 7, pulsating pump means connected to said gas pressure line for superposing a pulsating gas pressure on the gas supplied to said jet means.

References Cited by the Examiner

UNITED STATES PATENTS

| | | | |
|---|---|---|---|
| 1,019,496 | 3/12 | Larson | 236—87 |
| 2,670,426 | 2/54 | Stone | 219—378 |
| 2,795,686 | 6/57 | De Bruyne | 219—331 |
| 3,031,769 | 5/62 | Wilson | 165—104 |

FOREIGN PATENTS 1,098,519  3/55  France.

RICHARD M. WOOD, *Primary Examiner.*

ANTHONY BARTIS, *Examiner.*